(12) United States Patent
Christy et al.

(10) Patent No.: US 9,315,399 B2
(45) Date of Patent: Apr. 19, 2016

(54) METHOD AND APPARATUS FOR DISSOLVING SODIUM CARBONATE IN WATER

(75) Inventors: Richard W. Christy, Wayne, PA (US); Michael Quici, Ambler, PA (US)

(73) Assignee: RDP Technologies, Inc., Conshohocken, PA (US)

( * ) Notice: Subject to any disclaimer, the term of this patent is extended or adjusted under 35 U.S.C. 154(b) by 705 days.

(21) Appl. No.: 13/438,036

(22) Filed: Apr. 3, 2012

(65) Prior Publication Data

US 2013/0256238 A1  Oct. 3, 2013

(51) Int. Cl.
*B01F 1/00* (2006.01)
*C02F 1/68* (2006.01)
*C02F 1/66* (2006.01)

(52) U.S. Cl.
CPC . *C02F 1/68* (2013.01); *C02F 1/687* (2013.01); *C02F 1/66* (2013.01); *C02F 1/686* (2013.01)

(58) Field of Classification Search
CPC .................................................. B01F 1/0011
USPC ................................................. 422/261, 269
See application file for complete search history.

(56) References Cited

U.S. PATENT DOCUMENTS

| | | | |
|---|---|---|---|
| 4,064,744 A | 12/1977 | Kistler | |
| 4,166,997 A | 9/1979 | Kistler | |
| 4,454,770 A | 6/1984 | Kistler | |
| 4,482,528 A | 11/1984 | Emmett | |
| 4,589,559 A | 5/1986 | Hayashi et al. | |
| 5,313,022 A | 5/1994 | Piroozmandi et al. | |
| 5,770,823 A | 6/1998 | Piroozmandi | |
| 6,447,674 B1 | 9/2002 | Simon et al. | |
| 6,698,766 B2 | 3/2004 | Simon | |
| 7,416,673 B2 | 8/2008 | Christy et al. | |
| 7,669,348 B2 | 3/2010 | Christy et al. | |
| 2002/0012619 A1* | 1/2002 | Sano et al. | 422/292 |
| 2006/0231507 A1 | 10/2006 | Christy et al. | |
| 2006/0231511 A1 | 10/2006 | Christy et al. | |
| 2008/0185324 A1 | 8/2008 | Christy et al. | |

* cited by examiner

*Primary Examiner* — David Sorkin
(74) *Attorney, Agent, or Firm* — Paul & Paul

(57) ABSTRACT

Process and apparatus is provided for making a solution of sodium carbonate (soda ash) and water by which the soda ash is delivered in dry, particulate form to a silo, while air is being exhausted from the silo, dehumidifying air from the silo and discontinuing the dehumidifying of air while soda ash is being delivered to the silo, delumping soda ash in the silo, and then delivering water to a mixing vessel and transferring particulate soda ash to the treating vessel, in which it is mixed and the resulting solution is then discharged. The solution can be delivered to a storage tank or vessel and then to either a single or multiple outlet dosing station and/or some of the solution can be returned to a storage silo.

7 Claims, 3 Drawing Sheets

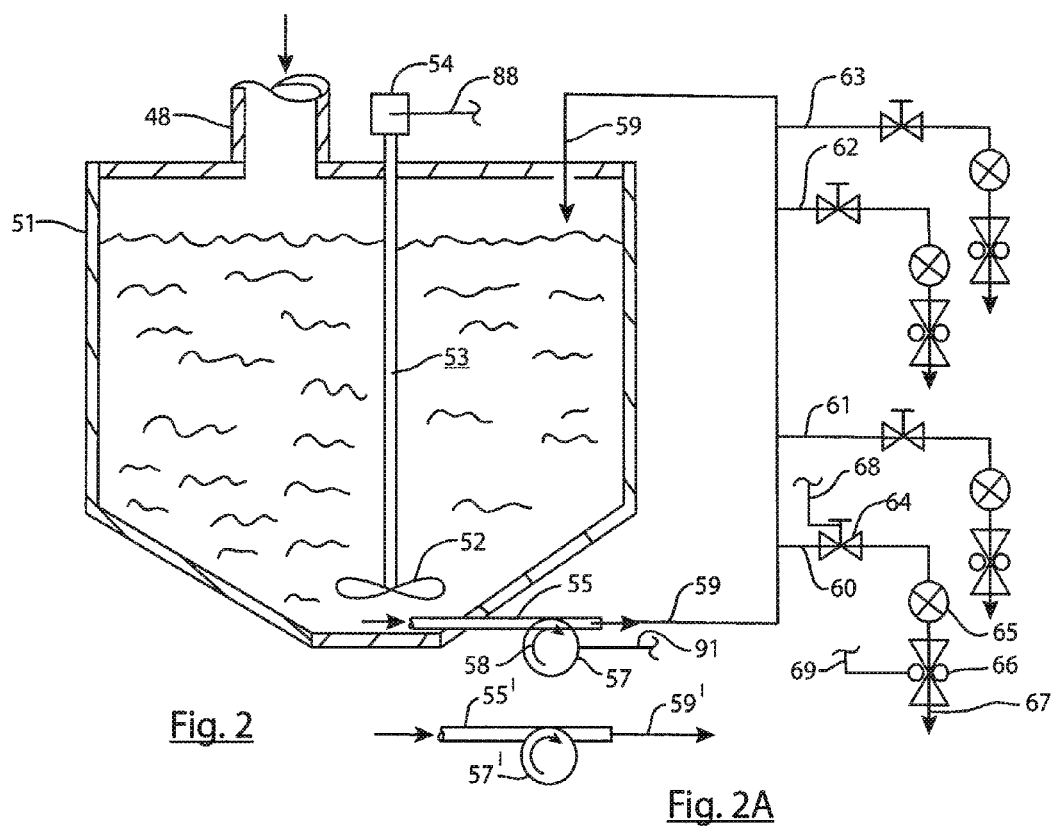
Fig. 2
Fig. 2A
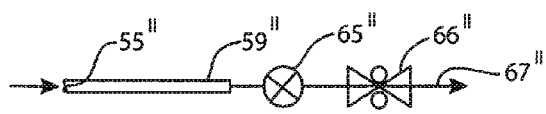
Fig. 2B

METHOD AND APPARATUS FOR DISSOLVING SODIUM CARBONATE IN WATER

BACKGROUND OF THE INVENTION

It has been known in the art to use sodium carbonate ($Na_2CO_3$), also called soda ash or baking soda, for water treatment. Sodium carbonate is a white, odorless, solid that is very soluble in water. Sodium carbonate is used to purify water and it is also used to increase the pH of water, when such is desired.

Treatment of water with sodium hydroxide can be for many purposes, for example, to purify water for human consumption, to meet certain desired levels of purification for industrial applications, to treat sewage water, to purify water by reducing concentrations of particulate matter, such as viruses, algae, bacteria, etc., and/or to comply with governmental standards for water purification.

THE PRESENT INVENTION

The present invention is directed to adding dry sodium carbonate to water, to produce a solution of sodium carbonate in a cost-effective and efficient manner. The water could be tap water, ground water, water from streams, rivers or the like, water from underground aquifers, waste water or sewage water, or to treat water from industrial applications. In general, the present invention is directed to the dissolution of such soda ash in water on a large scale basis.

SUMMARY OF THE INVENTION

In the addition of soda ash to water on a large scale basis, the sodium carbonate must be kept as dry as possible prior to its introduction into a vessel with water. To this end, the sodium carbonate is stored in a storage vessel, preferably of the silo type, that is humidity-controlled to keep it dry, and is dispensed from the vessel in a manner that avoids lumping, clumping or aggregation of the sodium carbonate in the vessel, in order to keep it from forming into a hardened, clay-like state, so that it can be handled for delivery into a mixing vessel, where it and water are mixed together.

Accordingly, it is a primary object of this invention to handle the sodium carbonate so that it is conditioned to be substantially moisture-free, initially in its storage vessel, and then to feed it into mixing vessel in which it can dissolve in water by means of a compound feeding system that also delumps the sodium carbonate if it has foiined into one or more substantially solid, clay-like structures in its storage vessel.

Other objects and advantages of the present invention will be apparent upon a reading of the following brief descriptions of the drawing figures, the detailed descriptions of the preferred embodiments, and the claims.

BRIEF DESCRIPTIONS OF THE DRAWING FIGURES

FIG. 2 is an enlarged schematic illustration in vertical section of a holding tank for the solution and its delivery through a precision single or multiple system, with an optional return to the storage vessel.

FIG. 2A is a fragmentary illustration of an alternative delivery of the solution from the holding tank directly to a treatment process.

FIG. 2B is yet another alternative delivery of the solution from the holding tank, through a magnetic flowmeter and a pinch valve, to a treatment process.

DETAILED DESCRIPTIONS OF THE PREFERRED EMBODIMENTS

Figure 1:
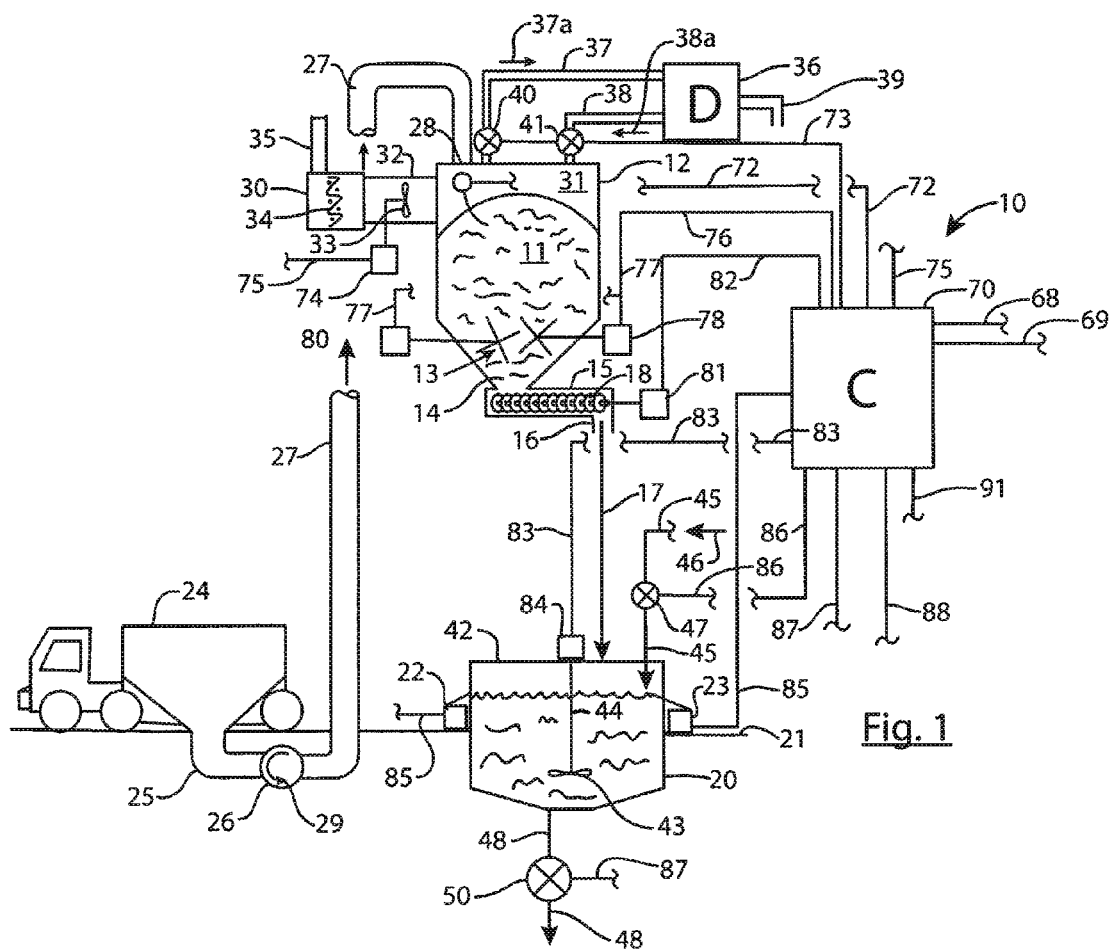
FIG. 1 is a schematic view of a system for creating a water solution of sodium carbonate, that addresses the issues discussed above, in which dry sodium carbonate is delivered to, and then from, a storage vessel or silo, then to a mixing vessel where a water solution is made, through the point at which the solution is discharged from the mixing vessel.

Referring now to the drawings in detail, reference is first made to FIG. 1, in which the sodium carbonate handling system 10 is generally illustrated.

The system 10 includes a storage silo 12 for receiving and containing sodium carbonate therein for a given period of time, with such substantially filling the silo 12 as shown at 11 therein. A delumping or declumping apparatus 13 is disposed toward the lower end of the silo 12, which will be discussed below with reference to FIG. 3. The silo 12 can take on any form so long as it can receive and hold the sodium carbonate.

The sodium carbonate 11 is discharged from the silo 12 via a bottom discharge 14 thereof, into a conveyor mechanism 15, and then via a discharge 16 from the conveyor mechanism. The conveyor mechanism 15 is preferably provided with a rotating auger 18 for receiving the sodium carbonate at the location 14 and discharging the same at the discharge location 16, into a mixing vessel 20 that receives water and into which the sodium carbonate is delivered via delivery line 17. The sodium carbonate is in the form of a dry, solid, particulate material that is preferably powder-like or in the foiin of other small particles.

The mixing vessel 20 is mounted on load cells 22 and 23 that, in turn, are disposed on a support surface 21. The load cells 22, 23 can be fixedly carried by the vessel 20, and convey information as to the weight of the vessel 20, with the water and sodium carbonate therein, to a computer 70, as will later be discussed herein. The load cells may be constructed as are the load cells in U.S. Pat. Nos. 7,669,348, or any one or more of U.S. Pat. Nos. 5,770,823; 4,064,744; 4,166,997; 4,454,770 and 5,313,022, the complete disclosures of which are herein incorporated by reference.

Sodium carbonate will generally be delivered to the system 10 by means of a delivery truck 24, having a bottom discharge such as that 25, with a blower, impeller, or other conveying mechanism 26 connected thereto, which can be driven in the direction of the arrow 29, up fill pipe 27, to enter the sodium carbonate storage silo 12 via inlet 28 thereof.

As sodium carbonate is delivered into the silo 12, it is necessary to discharge air from the upper end of the silo 12, both to make room for the sodium carbonate in the vessel 12, and to vacate some of the air at the upper end 31 of the vessel 12 in order to avoid undesirable pressure buildup therein.

Accordingly, air at the upper end 31 of the silo 12 is discharged via conduit 32, such discharge being preferably facilitated by an a motor driven fan 33 driving such air through a removable and cleanable or replaceable filter 34 in a dust collector system 30, for discharge of filtered air up discharge stack 35, as shown. The filter 34 can optionally be an electrostatic filter. The fan 33 is preferably automatically activated by means of a computer, that will later be discussed herein, when the truck 24 is filling the silo 12 via line 27.

A dehumidifier 36 is provided, for keeping the zone 31 above the sodium carbonate in the silo 12 as moisture-free as possible, having a suction line 37, for delivering air and any entrained moisture from zone 31 in the direction of line 37*a* to the dehumidifier 36, with the return line 38 being adapted for returning moisture-free air to the zone 31 of the silo 12 in the direction of arrow 38*a*. Moisture withdrawn via the dehumidifier 36 is discharged via discharge line 39 to any suitable discharge zone or conduit.

The suction and return lines 37 and 38 are automatically controlled via isolation valves 40 and 41 respectively, via the computer 70, the operation of which will be described hereinafter, to keep the lines 37 and 38 closed when the silo 12 is being filled via line 27 from the delivery truck 24.

Thus, as described above, sodium carbonate is delivered via line 17 into the mixing vessel 42, as is water from any suitable source, such as tap water, a river, stream, underground aquifer, industrial source or the like provided via water feed line 45 in which water is fed in the direction of the arrow 46 into the mixing vessel 42.

Water and sodium carbonate are mixed in the mixing vessel 42 by means of a rotating mixer 43, preferably shaft driven at 44 as will be described hereinafter.

The mixing of water and sodium carbonate in the mixing vessel 42 may continue for any desired period of time, until the dissolution of the sodium carbonate is completed, after which, the solution can be discharged from the bottom of vessel 42 via line 48, that is valve controlled at 50, into a holding or storage tank 51 (FIG. 2).

As shown in FIG. 2, within the tank 51, the solution, which contains perhaps 5% of sodium carbonate in water may continue to be mixed via a mixer 52, preferably shaft mounted at 53 and driven from a motor 54, for discharge through discharge line 55 of the holding tank 51, into discharge line 56. A pump or other impeller 57 may be driven in the direction of the arrow 58 shown, to discharge the solution via line 59, through one or a plurality of dosing assemblies 60, 61, 62 and/or 63.

Each dosing assembly 60-63 includes a valve 64, a preferably magnetic flowmeter 65 and a pinch valve 66 in a discharge dosing line 67, with the valves 64 each being preferably also connected to the computer 70, via an information feed line such as 68. The pinch valves 66 can also be connected to the computer 70 for computer-controlled operation via a control line such as line 69. The valves such 64 and 66 can also be manually operated if computer control is not desired.

The solution can also or alternatively be returned to the holding tank 51 via line 59.

With reference now to FIG. 2A an alternative to the discharge line 55 of FIG. 2 is illustrated, as discharge line 55', having a pump or impeller 57' in the line for delivery of the solution via line 59, directly to a treatment process.

With reference to FIG. 2B, yet another alternative is provided for gravity flow of solution from the tank 51 via line 59" from discharge line 55", delivering the solution through optional flowmeter 65" and modulating pinch valve 66" to a treatment process via line 67".

The computer 70 may control the operations of the various components of the system 10, and preferably, will be used to do so.

Below the inlet 28 of sodium carbonate delivery line 27 from the truck 24 into the silo 12, a sensor 71 may be disposed, to automatically sense when sodium carbonate starts to enter the upper end of the silo 12, so that the sensor 71 can, via electrical sensor line 72, alert the computer 70, so that the computer 70 can, via control line 73, automatically control the isolation valves 40 and 41, to shut down the isolation valves for the suction and return lines 37, 38, to discontinue air delivery to and from the dehumidifier 36, while the silo 12 is being filled with sodium carbonate.

The control line 75 from the computer 70 can automatically control the motor 74 that drives the fan or other air delivery device 33 for driving air through the filter 34 of the dust collector 35 and to discharge air from zone 31 of silo 12 during the filling of the silo 12 with sodium carbonate 11 via fill line 27, in response to activation of the sensor 71 detecting the filling of the silo 12.

Figure 3:
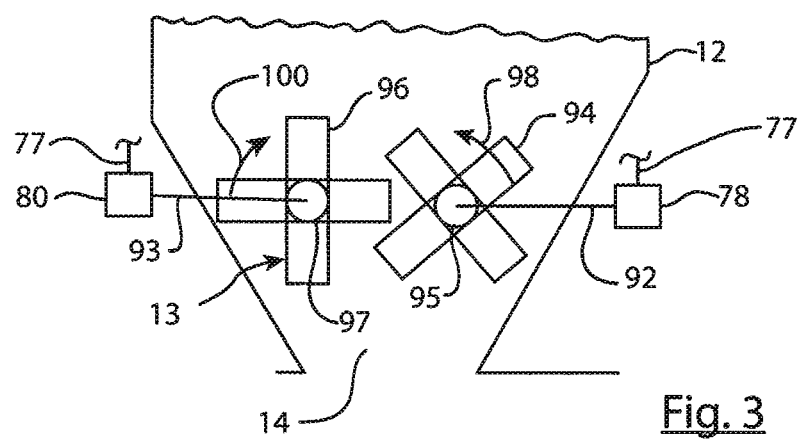
FIG. 3 is an enlarged fragmentary illustration of a delumper device, for breaking up lumps or solid formations of sodium carbonate in a storage vessel.

The delumper system 13 at the bottom of the silo 12 is operated by means of the computer control line 76, controlling the operation of the motors 78, 80 via control lines 77, for operating the delumper 13, the details of which will be addressed in the detailed description of the apparatus of FIG. 3.

The computer 70, when it is desired to supply sodium carbonate into the mixing vessel 42, will, by means of control line 82, control the operation of the motor 81 that drives the shaft for rotating the auger 18, to deliver sodium carbonate via auger discharge 16 and supply line 17, into the mixing vessel 42.

The mixer 43 that is shaft-mounted at 44, is controlled by a motor 84, that, in turn, is driven via control line 83 from the computer 70, to control the mixing done within the mixing vessel 42 on a continuous, or discontinuous basis, as may be desired.

The load cells 22, 23 transmit information regarding the weight of the sodium carbonate and water in the mixing vessel 42, as well as the weight of the vessel 42 itself, back to the computer 70, via information input line 85. This enables the computer to control the amount of sodium carbonate as well as the amount of water that is needed to be delivered to the mixing vessel 42, at any given time, in order to maintain a desired, pre-set ratio of sodium carbonate to water, within the vessel 42.

The control of water being delivered via water supply line 45, to the mixing vessel 42 is controlled by operation of the valve 47 via control line 86, also from the computer 70.

When the mixing of water with sodium carbonate within the mixing vessel 42 has reached a desired level, the valve 50 in line 48 between the mixing vessel 42 and the holding tank or vessel 51 can be opened either manually or via control line 87, also as dictated by the computer 70, for delivery of solution into the holding tank or vessel 51. The mixing that occurs via mixing impeller 52 in the holding vessel 51, as driven by motor 54, can be controlled by control of the motor 54 by motor control line 88 from the computer 70.

Control line 91 from the computer 70 can also control the on/off operation of the pump 57 for delivery of solution from the holding tank 51 to line 59.

With reference now to FIG. 3, an enlarged, more detailed, schematic view of the delumping device 13 is provided.

Within the bottom of the silo 12, the delumping mechanism 13 is illustrated, driven from the computer 70 via control lines 77 that control the on and off operation of the motors 78, 80 that drive the shafts 92, 93 that in turn control the rotation of the shaft 95, 97 that drive the multi-bladed, e.g. only, four-bladed delumping paddles 94, 96, that will preferably rotate in the directions of the respectively associated arrows 98, 100, in order to break up solid formations of sodium carbonate that may build up in the bottom of the silo 12. Such solid formations can be similar in hardness to hardened clay or the like, requiring periodic or continuous breaking-up, in order for the sodium carbonate to flow freely into the transport or conveyor device 15 for delivery via the auger 18, into the mixing vessel 42.

From the foregoing, it will be apparent that, in accordance with the present invention, a system is provided in which sodium carbonate may be provided in some manner, such as from a truck 24, and delivered to a silo 12, via a fill line 27. When the sodium carbonate is being delivered into the silo 12, air can be exhausted from the top 31 of the silo 12 via the dust collector system 30, fan-driven, through a filter 34, for discharge of clear air up the discharge stack 35.

After the filling of the silo with sodium carbonate, the dehumidifier 36 may be activated by controlling the operation of the isolation valves 40, 41 as described above, to maintain proper humidity control within the silo 12.

The dehumidifier 36 includes a recirculating fan (not shown), and the means controlling the on/off operation of the recirculating fan, that being the computer 70 in the illustrated embodiment, controls the on/off operation of the recirculating fan so that it is normally on, but is off when particulate sodium carbonate is being delivered to the sodium carbonate silo 12.

When it is desired to discharge sodium carbonate from the silo 12, the delumper mechanism 13 is activated, such that it's paddles rotate, to break up any hardened lumps, in order that the conveyor or other transport mechanism 15 may readily transport the same into a fill line 17, and for inflow of water via water line 45 to mix with the sodium carbonate in the mixing vessel 42. A mixer 43 can continuously or discontinuously mix the sodium carbonate with the water in the vessel 42, until the dissolution of the sodium carbonate in water is complete, and it is ready for discharge via line 48 into a holding tank or a vessel 51.

The solution within the tank 51 may be continuously or periodically mixed via a motor-driven mixer 52.

When the solution is desired from the holding tank 51, such may be delivered therefrom, via line 55, through one or more precision dosing assemblies 60-63 and the solution is conveyed preferably via a pinch valve such as 66 for delivery via a dosing outlet such as 67.

It will be understood that all of the valves, motors, sensors and actuation devices of any kind, may either be manually operated, or computer operated, as described above. As used herein, where "means" are recited, followed by functional language, it is to be understood that such means encompasses any means that is able to perform the recited function, and is not limited to the specific structure disclosed herein as providing that means and its equivalents.

It will be apparent from the foregoing that various modifications may be made in the details of the operating components of the system 10, as well as in their operation, all within the spirit and scope of the invention as defined in the appended claims.

What is claimed is:

1. Apparatus for dissolving sodium carbonate in water, comprising:
   (a) a sodium carbonate storage silo;
   (b) a conveying mechanism for delivering particulate sodium carbonate into the sodium carbonate storage silo, and a motor-driven fan for evacuating sufficient air from the sodium carbonate storage silo to accommodate the amount of sodium carbonate being delivered into the storage silo;
   (c) a dehumidifier connected to the sodium carbonate storage silo to keep the particles of sodium carbonate from bonding together, and a suction line for withdrawing air from the sodium carbonate storage silo and providing it to the dehumidifier for dehumidifying that air, and a return line for returning dehumidified air to the sodium carbonate storage silo;
   (d) at least one valve for discontinuing the dehumidifying of air in accordance with clause (c) above while the sodium carbonate storage silo is having sodium carbonate delivered thereto in accordance with clause (b);
   (e) motors for driving shafts having multi-bladed delumping paddles for delumping any solidified lumps of sodium carbonate in the sodium carbonate silo;
   (f) a mixing vessel and, a valve and a water supply line for delivering water to be treated to the mixing vessel;
   (g) a motor-driven auger for transferring particulate sodium carbonate to the mixing vessel from the sodium carbonate silo;
   (h) a mixer for mixing sodium carbonate and water in the mixing vessel until a solution is obtained of sodium carbonate and water; and
   (i) a line for discharging the solution from the mixing vessel.

2. The apparatus of claim 1, further including a sensor for automatically sensing the delivery of sodium carbonate to the sodium carbonate storage silo and a computer to control the motor-driven fan in response to the sensor.

3. The apparatus of claim 1, further including a filter for filtering the evacuated air from the sodium carbonate storage silo, and a fan-driven dust collection system for exhausting the filtered air to atmosphere.

4. The apparatus of claim 1, further includes a computer; and suction and return valves between the sodium carbonate silo and the dehumidifier, the computer controlling the opening and closing of those valves so that they are normally open, but are closed when particulate sodium carbonate is being delivered to the sodium carbonate silo.

5. The apparatus of claim 1, further including a computer, wherein the computer controls the dehumidifier to discontinue the dehumidifying of the air in the silo when particulate sodium carbonate is being delivered to the sodium carbonate silo.

6. The apparatus of claim 1, further including a holding tank for the solution and at least one dosing station and at least one valve for controlling delivery of the solution to the at least one dosing station.

7. The apparatus of claim 6, wherein the at least one valve for controlling delivery of the solution includes at least one pinch valve.

* * * * *